US008510301B2

(12) United States Patent  
Cardamore (10) Patent No.: US 8,510,301 B2
(45) Date of Patent: Aug. 13, 2013

(54) SYSTEM FOR SELECTING A MEDIA FILE FOR PLAYBACK FROM MULTIPLE FILES HAVING SUBSTANTIALLY SIMILAR MEDIA CONTENT (75) Inventor: Dan Cardamore, Ottawa (CA)

(73) Assignee: QNX Software Systems Limited, Kanata, Ontario (CA)

( * ) Notice: Subject to any disclaimer, the term of this patent is extended or adjusted under 35 U.S.C. 154(b) by 435 days.

(21) Appl. No.: 11/947,386

(22) Filed: Nov. 29, 2007

(65) Prior Publication Data

US 2008/0147739 A1 Jun. 19, 2008

Related U.S. Application Data (60) Provisional application No. 60/875,222, filed on Dec. 14, 2006.

(51) Int. Cl.
G06F 7/00 (2006.01)
G06F 17/30 (2006.01)

(52) U.S. Cl.
USPC ........................................................ 707/736

(58) Field of Classification Search
USPC ................. 707/736, 600, 737, 740; 709/227; 713/600
See application file for complete search history.

(56) References Cited

U.S. PATENT DOCUMENTS

| 4,251,688 | A  | * | 2/1981 | Furner | 381/18 |
| 6,085,199 | A  | * | 7/2000 | Rose | 707/823 |
| 6,888,477 | B2 | * | 5/2005 | Lai et al. | 341/50 |
| 6,938,047 | B2 | * | 8/2005 | Kryeziu | 1/1 |
| 7,533,061 | B1 | * | 5/2009 | Cheng et al. | 705/50 |
| 7,562,099 | B1 | * | 7/2009 | Walsh et al. | 707/104.1 |
| 7,623,502 | B2 | * | 11/2009 | Wassingbo et al. | 370/338 |
| 2002/0083091 | A1 | * | 6/2002 | Pulier et al. | 707/501.1 |
| 2003/0009248 | A1 | * | 1/2003 | Wiser et al. | 700/94 |
| 2003/0055995 | A1 | * | 3/2003 | Ala-Honkola | 709/231 |
| 2003/0110234 | A1 | * | 6/2003 | Egli et al. | 709/217 |
| 2003/0120726 | A1 | * | 6/2003 | Archibald et al. | 709/203 |
| 2003/0131226 | A1 | * | 7/2003 | Spencer et al. | 713/100 |
| 2004/0004631 | A1 | * | 1/2004 | Debique et al. | 345/704 |
| 2004/0032680 | A1 | * | 2/2004 | Fujiwara | 360/15 |

(Continued)

FOREIGN PATENT DOCUMENTS

| GB | 2 356 069 A | 5/2001 |
| JP | 2003-110448 | 4/2003 |

(Continued)

OTHER PUBLICATIONS

Bach, E. et al., "Bubbles: Navigating Multimedia Content in Mobile Ad-hoc Networks," Proceedings of the 2$^{nd}$ International Conference on Mobile and Ubiquitous Multimedia, Dec. 12, 2003, pp. 73-80, XP-002471894.

(Continued)

Primary Examiner — Robert Beausoliel, Jr.
Assistant Examiner — Nicholas Allen
(74) Attorney, Agent, or Firm — Brinks Hofer Gilson & Lione (57) ABSTRACT A media system has media file storage that includes two or more media files having substantially the same media content. The two or more media files have different playback characteristics. The media system uses the playback characteristics to select one of the two or more media files for playback.

22 Claims, 7 Drawing Sheets

(56) References Cited

U.S. PATENT DOCUMENTS

| | | | |
|---|---|---|---|
| 2004/0083273 A1* | 4/2004 | Madison et al. | 709/217 |
| 2004/0120267 A1* | 6/2004 | Howell | 370/253 |
| 2004/0131340 A1* | 7/2004 | Antoun et al. | 386/125 |
| 2004/0193648 A1* | 9/2004 | Lai et al. | 707/104.1 |
| 2004/0226048 A1* | 11/2004 | Alpert et al. | 725/109 |
| 2005/0220139 A1* | 10/2005 | Aholainen | 370/466 |
| 2005/0240588 A1* | 10/2005 | Siegel et al. | 707/9 |
| 2005/0240596 A1* | 10/2005 | Worthen et al. | 707/10 |
| 2005/0273399 A1* | 12/2005 | Soma et al. | 705/26 |
| 2006/0048057 A1* | 3/2006 | Herberger et al. | 715/723 |
| 2006/0232448 A1* | 10/2006 | Silverman et al. | 341/50 |
| 2006/0265427 A1* | 11/2006 | Cohen et al. | 707/200 |
| 2007/0147351 A1* | 6/2007 | Dietrich et al. | 370/352 |
| 2007/0157260 A1* | 7/2007 | Walker | 725/86 |
| 2007/0220024 A1* | 9/2007 | Putterman et al. | 707/101 |
| 2008/0141303 A1* | 6/2008 | Walker et al. | 725/39 |
| 2009/0319479 A1* | 12/2009 | Min et al. | 707/3 |

FOREIGN PATENT DOCUMENTS

| | | |
|---|---|---|
| JP | 2004-134010 | 4/2004 |
| JP | 2004-158141 | 6/2004 |
| JP | 2004 158141 A | 6/2004 |
| JP | 2006-079782 | 3/2006 |
| WO | WO 2005/001831 A2 | 1/2005 |

OTHER PUBLICATIONS

Office Action dated Dec. 14, 2012 from corresponding Japanese Patent Application No. 2007-322492, 5 pages.

Japanese Office Action from related JP Patent Application No. 2007-322492; pp. 1-7; May 8, 2013.

\* cited by examiner

| FIELD NAME | FIELD CONTENTS |
|---|---|
| fid | The FID for the media track |
| msid | The mediastore that this track is stored on |
| pathid | The path in the mediastore where the file is found |
| filename | The filename of the media track |
| ftype | The type of the media track (audio, photo, video, etc.) |
| copy_id | Used for relating to the copies table, which relates one copy to another |
| valid | Indicates whether this track is valid |
| accurate | Indicates whether the metadata for the track is correct |
| copyright | The copyright year of the track |
| seen | Indicates that the track has been identified on the mediastore |
| artist_id | The ID of the track artist |
| title | The track title |
| album_id | The ID of the track album |
| genre_id | The ID of the track genre |
| year | The year of the track |
| size | The size of the track |
| artwork_id | The ID of the track artwork |
| category_id | The ID of the track category |
| composer_id | The ID of the track composer |
| description | An arbitrary text description of the track |
| time | The track length |
| date_added | The date the track was added to the library table |
| date_modified | The date the track entry was modified in the library table |
| last_played | The date this track was last played by the MME |
| play_count | The number of times this track has been played by the MME |
| rating | The user rating for the track |
| equalizer_id | The ID for an equalizer setting for this track |
| bitrate | The track bitrate |
| titlenum | The title/group number of the CDDA/DVDV/DVDA |
| tracknum | The track/chapter number of the CDDA/DVDV/DVDA |
| samplerate | The sampling rate of the audio stream in, for example, Hertz. |
| genre_id | The ID of the track genre. |
| category_id | The ID of the track category. |
| composer_id | The ID of the track composer. |
| discnum | The disc number. |
| num_channels | The number of audio channels to be used by this track. |

Figure 3

| FIELD NAME | FIELD CONTENTS |
|---|---|
| @field plid | The playlist ID |
| @field ownership | Indicates who owns this playlist (MME, device, etc.) |
| @field available | Indicates whether this playlist is available (Are the devices having the media files attached to system?) |
| @field msid | A link to a media store |
| @field mode | The playlist mode: library or browse |
| @field date_modif | The date this playlist was last modified |
| @field size | The number of tracks in the playlist |
| @field filename | If the playlist points to the the filename of playlist on a device |
| @field name | The playlist name |
| @field statement | An SQL statement that returns a list of FIDs, either from the library table, or the playlistdata table. |

Figure 4

| FIELD NAME | FIELD CONTENTS |
|---|---|
| msid | The media store identifier used to link to other tables. |
| slotid | The slot in which the media store is inserted. |
| available | Set to a predetermined value if the media store is available. All music in the library table is available if it's media store is available. |
| storage_type | The type of media store. |
| name | The textual name that is to be displayed to the user for the media store. |
| identifier | The unique identifier for the media store device. For AudioCDs, this is their discid, for USB Mass storage sticks, this is the serial number, etc. |
| lastplayedfid | The last fid played from the media store. |
| lastplayedpos | The last played position of the last played fid. |
| mountpath | The mount path of the media store. |
| active | Indicates if a mediastore is active or a slot change is warranted. |
| slotid | The device slot in which the mediastore is currently inserted. |
| syncflags | Indicates which synchronizations have been executed for the device. 0=none; 1=files; 2=metadata; 4=playlists |

Figure 5

| FIELD NAME | FIELD CONTENTS |
|---|---|
| slotid | The slot identifier which links to other rows in the mediastores table |
| active | If 0 then the slot currently has no mediastore activated. If 1 then it is has a mediastore activated in it. |
| msid | If > 0 then it is the mediastore id of the mediastore inserted |
| slottype | The type of slot. |
| concurrency | The maximum number of readers on the slot type. |
| path | The full filesystem pathname to monitor for insertions. |

Figure 6

| Field | Description |
|---|---|
| copyid | Used for relating to the copies table, which relates one copy to another. |
| fid | Unique file identifier. |
| original | Identifies whether this is an original copy of the file. |

SYSTEM FOR SELECTING A MEDIA FILE FOR PLAYBACK FROM MULTIPLE FILES HAVING SUBSTANTIALLY SIMILAR MEDIA CONTENT

PRIORITY CLAIM

This application claims the benefit of priority from U.S. Provisional Application No. 60/875,222, filed Dec. 14, 2006, which is incorporated herein by reference.

BACKGROUND OF THE INVENTION

1. Technical Field

The invention relates to media systems, and in particular, to a system that selects a media file from multiple files having substantially similar media content.

2. Related Art

Multimedia systems may include one or more media players to play content. Such players may include various portable units and other media content playback devices. The media files may have different media characteristics. The differing characteristics may include coding formats, sampling criterion, storage on differing devices, or other file characteristics that define playback of a media file.

Some multimedia systems may include multimedia files having substantially the same multimedia content. Files having substantially the same content may be stored on the same device and/or different devices and may have different playback characteristics. Files having substantially the same concept may be identified when they have the same title or other similar content identification. The multimedia system may default to playback of a particular file of the multiple files without reference to the other files. This may result in wasted storage space in that the remaining files are never used. When there are files having substantially the files may not play.

SUMMARY

A media system has media file storage that includes two or more media files having substantially the same media content. The two or more media files have different playback characteristics. The media system uses the playback characteristics to select one of the two or more media files for playback.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 3 shows fields that may be used in a library file that may be used in the systems of FIG. 1 and FIG. 2.

FIG. 4 shows fields that may be used in a playlist table that may be used in the systems of FIG. 1 and FIG. 2.

FIG. 5 shows fields that may be used in a media stores table that may be used in the systems of FIG. 1 and FIG. 2.

DETAILED DESCRIPTION OF THE PREFERRED EMBODIMENTS

Figure 1:
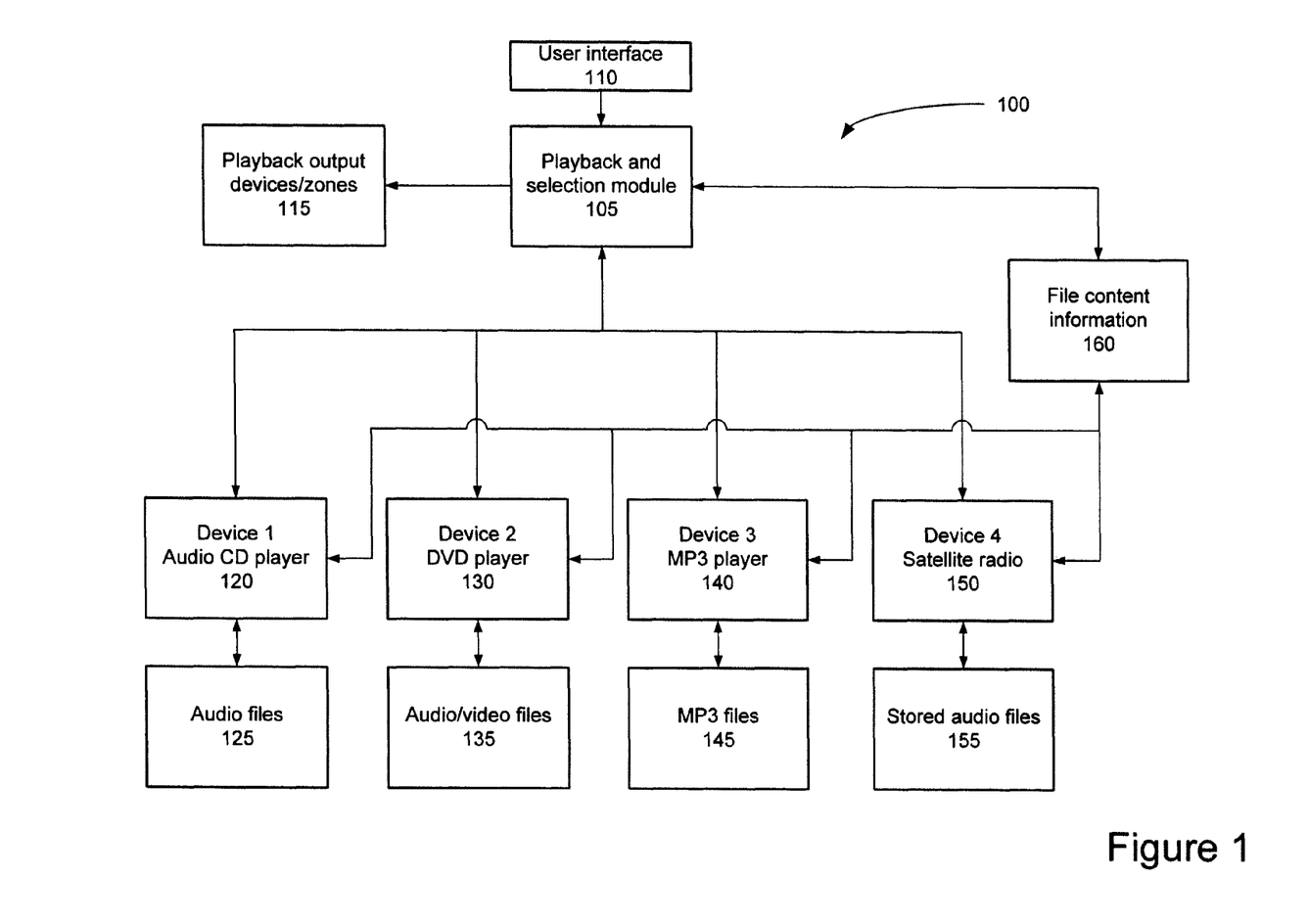
FIG. 1 illustrates a multimedia system capable of selecting a multimedia file for playback from multiple files having substantially the same media content.

FIG. 1 is a diagram of a multimedia system 100 that may be used to access media files having substantially similar media content based on file playback characteristics. The system 100 may include a media playback and selection module 105 that provides high level interaction between multiple media devices in system 100 and a user interface 110. The media playback and selection module 105 may facilitate selection of media files from multiple devices and allow playback of the selected media files through output devices associated with one or more playback zones 115.

In the system shown in FIG. 1, four media devices are attached to system 100. The first device 120 may include a CD player capable of accessing CD audio files 125 for information and playback using the playback and selection module 105. The second device 130 may include a DVD player capable of accessing DVD audio/video files 135 for information and playback using the playback and selection module 105. The third device 140 may include an MP3 player capable of accessing MP3 audio files 145 for information and playback using the playback and selection module 105. The fourth device 150 may include a satellite radio capable of accessing stored audio files 155 for information and playback using the playback and selection module 105.

System 100 may include multiple multimedia files having substantially the same multimedia content. Files having substantially the same media content may be stored on the same device and/or different devices and may have differing playback characteristics. For example, the same song may be included in the CD audio files 125 and the MP3 audio files 145. The same song may also be included in the MP3 audio files. If a song is selected for playback, the system 100 may be able to locate different versions of the song in the audio files 125 of the audio CD player 120, the audio files 135 of the DVD player 130, the MP3 files 145 of the MP3 player 140, and/or the stored audio files 155 of the satellite radio 150. Although the song copies may have the same media content, the different versions may have different characteristics. The different versions may differ in terms of playback quality and may have a different impact on the system resources when played back. Other multimedia storage, recording and/or playback devices may also be included in system 100. As such, multiple files having substantially identical video media content may also be present, the discussion using audio files being exemplary.

The multimedia system may have similar access to more than one multimedia file having substantially the same media content. Some copies may have lower quality "lossy" encodings than an original. Some copies may be stored on removable devices that do not provide quick access to the resource. Some copies may be stored on devices that cannot immediately respond to a request. Some copies may be stored on devices that consume more system resources for playback than others.

The system may differentiate one copy from another and automatically choose an appropriate copy to play when a user makes a selection or specifies that any of those copies may be played. One method of selection considers available copies, the characteristics of each copy, and may respond to criteria for overriding a file with a copy when a file is requested or accessed.

When multiple files having substantially the same media content are stored on or interface to system 100, the playback and selection module 105 may operate to determine which of the files are used for playback by analyzing the characteristics of the multiple files. Such characteristics may include the type of encoding used for each file, the sampling rate and/or bit rate associated with each file, the storage location for each file, or other characteristic.

Information relating to the media files 125, 135, 145, and 155 of devices 120, 130, 140, and 150 may be obtained by the playback and selection module 105. This information may include characteristics used by the playback and selection module 105 to select a given file having the desired media content. The playback and selection module 105 may access this information directly through the devices 120, 130, 140, and 150. Additionally, or in the alternative, the characteristics of the files 125, 135, 145, and 155, may be synchronized and stored in file content information storage 160 for access by the playback and selection module 105. The information in the file content information storage 160 may be divided between multiple components, each of which may reside on one or more distributed devices. Media playback and selection module 105 may navigate the information stored in these components as if the information were stored in a single database.

The information in the file content information storage 160 may comprise a consolidation of all the information relating to media files 125, 135, 145, and 155. The information may be stored in a format that is generally independent of the device on which each media file is stored. Access to this information by the media playback and selection module 105 may be obtained without a prior knowledge of the media device on which the corresponding media file is located. A media file may be selected for playback through the user interface 110 and the media selection and playback module 105. Selection may be accomplished by media name, media genre, artist, playlist name, or similar selection criterion, without regard to the locations or state of the corresponding files. A user may request playback of all media files having a genre of "Country" and the media selection and playback module 105 may locate and playback all media files identified of that genre independent of the device(s) on which the files are located.

The system 100 may dynamically detect additional new devices as they are attached or interfaced with the system 100. The system may send and/or retrieve information through a wireless medium (radio, optical signaling, or some other wireless technology) and/or through a physical, wired connection. Upon identification of the added device, information relating to the media file contents corresponding to the device may be automatically identified and included or indexed in the file content information storage 160.

Figure 2:
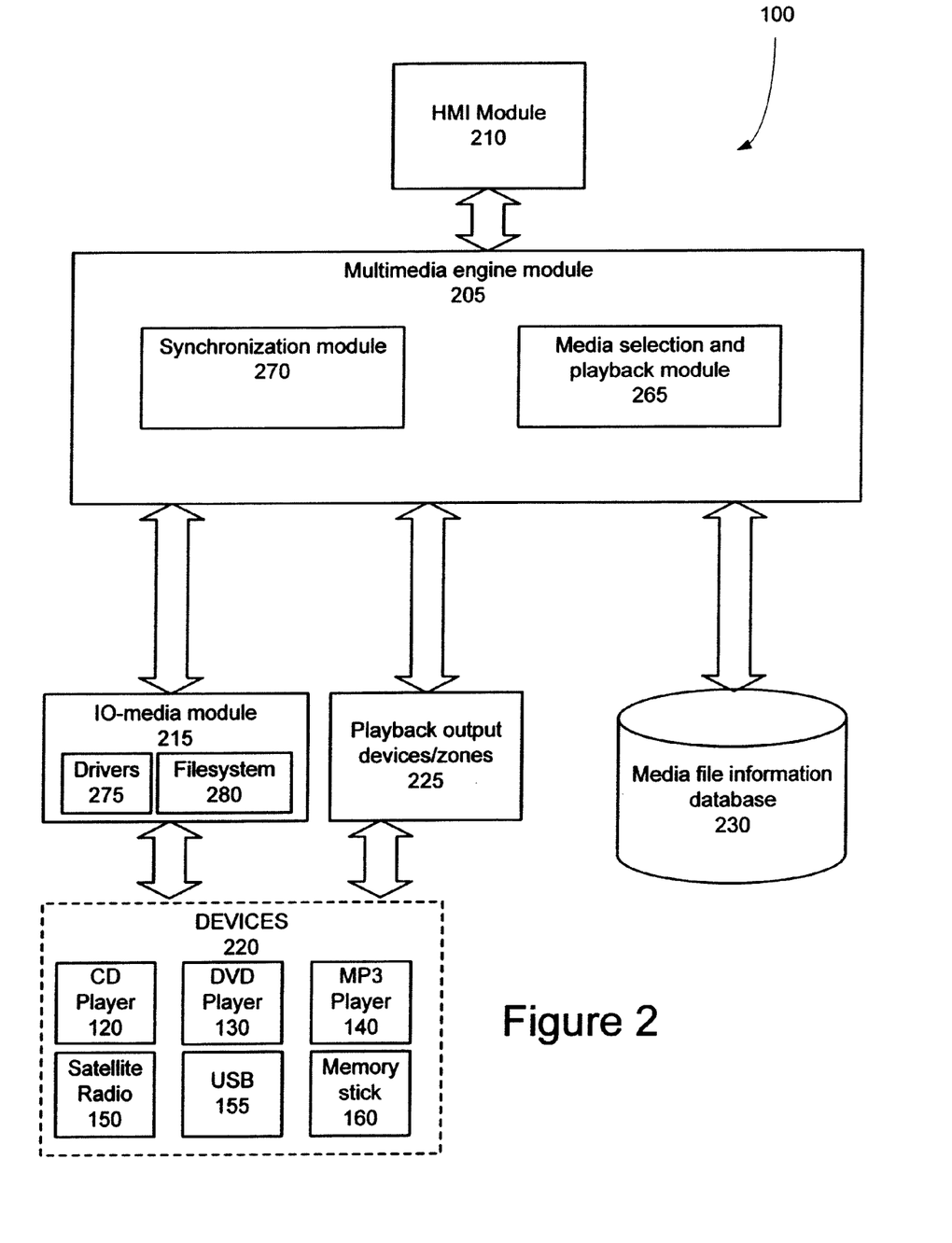
FIG. 2 illustrates another multimedia system capable of selecting a multimedia file for playback from multiple files having substantially the same media content.

FIG. 2 is another block diagram of a multimedia system 100. The system 100 may include a Multimedia Engine (MME) module 205 that interacts with a human machine interface (HMI) module 210 and interacts with an IO media module 215 that provides an interface that may communicate through one or more protocols with a plurality of different multimedia devices 220 and the MME module 205. The HMI module 210 includes an interface that may include multimodal user inputs such as voice, touch buttons, and touch screens that serve as a point of interaction with a user to identify the content to be played and to request certain playback operations. The information acquired by the HMI module 210 in response to these user interactions may be passed to the MME module 205. The MME module 205 may obtain media file information for a requested file name, file type, genre, artist, etc., directly from the devices 220 through the IO-media module 215. Alternatively, or in addition, the media file information may be obtained using metadata from media file information stored in one or more databases 230. Database(s) 230 may be used by the MME module 205 to store and retrieve metadata for media files that client applications, such as the HMI module 210, access. The client applications may use this information to display media files to a user or otherwise arrange for playback of the media files in a desired manner on one or more playback output devices/zones 225. Database 230 may support multiple connections from multiple clients in a concurrent manner. The information in database 230 may be divided between multiple files. Each database file can be stored in RAM, flash, or hard drives in a configurable manner that does not affect access by higher level applications.

The HMI module 210 may be used to implement a variety of different functions, including the following:

1. Sending requests to the MME 205 for playback and copying of media files on the devices 220. It may be allocated to the HMI module 210, as manipulated by a user, to decide which media is to be played and in what order. The resulting request may then be sent to the MME 205 for processing. Playback of the selected media to one or more of the playback output devices/zones 225 may be placed under the control of the media selection and playback module 265 of the MME module 205.
2. Browsing the media file contents of devices 220. The MME module 205 may access database 230 to expose some or all of the available media to the HMI module 210. User commands may be input to the HMI module 210 to direct the MME module 205 to return information relating to selected media to the HMI module 210.
3. Supporting the MME module 205 browsing interface. Some devices may allow the client application to browse them directly. For example, when a DVD Video is played, its on-screen navigation menu may appear. The HMI module 210 may be used to send navigation commands (such as up, down, left, right, play, etc) to the device through the MME module 205 to navigate the DVD menu.
4. Accepting notifications from the MME module 205 and responding accordingly. The MME module 205 may provide event notifications to a client application. Some examples of events that may generate notifications are "song changed," "new device inserted," and so on. The HMI module 210 may remain synchronized with the MME module 205 and media by, for example, accepting such messages and updating itself accordingly.

The MME module 205 may be implemented as a resource manager that handles device discovery and synchronization using a synchronization module 270. The synchronization module 270 may be used to synchronize the media file information of database 230 with the media content of devices 220. The MME module 205 may provide a high-level API for managing playback (play, stop, and seek commands) using the media selection and playback module 265.

The MME module 205 may be responsible for a wide range of functions, including:

1. Playing media. Such media operations may be executed by the media selection and playback module 265 and may include seeking, pausing, stopping, changing volume, adjusting balance and fade, and so on. The media selection and playback module 265 may abstract the type of media and how it is played from the client application level, such as HMI module 210. When the HMI module 210 instructs the MME module 205 to play some media in a DVD player, the HMI module 210 does not need to know whether the media is stored on an audio CD or DVD in the drive. The playback may be handled by the media selection and playback module 265 of the MME module 205. However, for some devices like iPods or PlaysForSure devices, the MME module 205 may pass the playback request to the device itself.
2. Synchronizing devices 220 and the database 230. The synchronization module 270 of the MME module 205 may be used to update the database 130 with metadata corresponding to the media files and devices that it detects. Client applications may browse the database 230 either directly and/or through the MME module 205 to browse music, create playlists, and so on. When a media device 220 is connected to the system 100, the MME module 205 may detect its presence and begin synchronizing the information on the device with the database 230. The information in database 230 may consolidate metadata from multiple, diverse devices 220 into a single format that is independent of the types of devices attached to system 100. Synchronization may also include maintaining a relationship between multiple files having substantially the same media content.
3. Providing a browsing interface for devices. Because of the large list of devices that the MME module 205 may support, it may be provided with a browsing abstraction layer that is the same for all devices. This allows a client application, such as the HMI module 210, to browse all devices supported by the MME 105 without having to support them directly.
4. Selection of a media file from multiple files of substantially similar content. The media selection and playback module 265 may receive commands for playback of media content from the HMI module 210. Where multiple media files on system 100 have substantially the same content, the media selection and playback module 265 may select from one of the multiple copies using characteristics of the individual files. Such characteristics may include the type of encoding used for each file, the sampling rate and/or bit rate associated with each file, the storage location for each file, or other characteristic. The media selection and playback module 265 may use such characteristics to select the copy having the best quality for playback. Files encoded in a lossless format may have priority over files encoded in a lossy format. Files encoded using a higher sampling rate may have priority over files encoded using a lower sampling rate. Other quality playback criterion may also be used. Further, the media selection and playback module 265 may use such characteristics to select a particular copy for playback based on available system resources. If copies of a media file are available on CD player 120 and MP3 player 140, the media selection and playback module 265 may selected the copy on MP3 player 140 for playback where the CD player 120 is concurrently playing back other media.

Database 230 may index all or some multimedia files. The database 230 may communicate through a structured query language or other language that may relate one file to another. The records in database 230 may have a number of different structures depending on the requirements of the system. Some fields that may be used in the library file of such database records and their corresponding meaning are shown in the table of FIG. 3. Exemplary fields that may be used in connection with a playlist table in database 230 are shown in FIG. 4.

Database 230 also may include a media stores table. Each mediastore in the mediastores table describes one physical device containing media that the multimedia engine 205 has detected. This may be an iPod®, hard drive, USB stick, DVD video disc, or some other device/medium that may be read from or written to. Mediastores may come and go as they are inserted and removed and this table is updated accordingly as that happens. The entries in the library table may belong to one mediastore, which is where the media is located or indexed. Mediastores may be uniquely identified by an identifier that may be used to attain the identifier for the mediastore which links to the other tables. FIG. 5 shows fields that may be used in connection with the media stores table.

Figure 6:
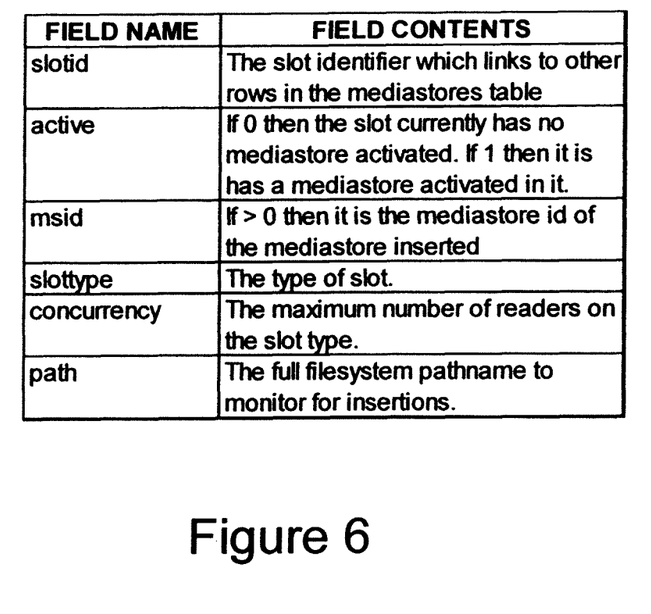
FIG. 6 shows fields that may be used in a slots table that may be used in the systems of FIG. 1 and FIG. 2.

Still further, the database 230 may include a slots table. Slots may be used to define filesystem locations where mediastores can be connected and removed. For example, an audiocd may be found in the filesystem at location /fs/cd0. If it were a networked audiocd, it may be found at /net/remote_host/fs/cd0. The MME 205 may be designed to support an unlimited number of slots. FIG. 6 shows fields that may be used in connection with the slots table.

The metadata corresponding to a file may be stored with the media containing the file. However, it is also possible for an external source to add metadata or to link metadata to a file. Metadata about a file may include information regarding the music type and the group that produced the music. Some alternative systems incorporate various additional types of metadata. For example, the metadata may include information on the quality of the content stored in the file. This quality information may be used in the selection of contents to be played for a user, or with certain license or other restrictions associated with the content.

Figure 7:
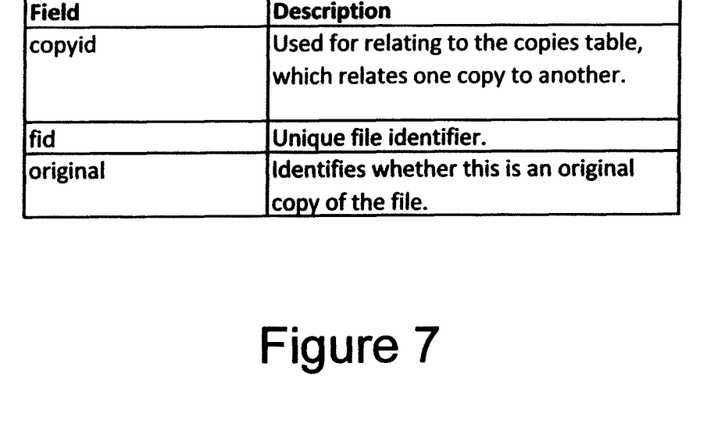
FIG. 7 shows fields that may be used in a copies table that may be used in the systems of FIG. 1 and FIG. 2.

Fields that may be used in a copies table are shown in FIG. 7. The copies table may be used to relate multiple copies of files having substantially the same media content to one another. The copy_id field of FIG. 3 may be used for relating the identified file to the copyid field of the copies table of FIG. 7. The fid field of the copies table may be a unique file identifier that references the corresponding fid in the library format shown in FIG. 3. The "original" field indicates whether a file is an original or not.

The copies table may have multiple rows for each copy of a file. If there are no copies of a file, there will not be a corresponding entry for the file in this table. If there were a file with fid=1, and it had 2 copies with fid's of 2 and 3, the copies table entries for the multiple files having substantially the same media content may be represented in the following manner:

| copyid | fid |
|--------|-----|
| 1 | 1 |
| 1 | 2 |
| 1 | 3 |

In response to an access request to a multimedia file with fid #1, the following may be used to identify corresponding copies:
SELECT fid, bitrate, frequency FROM library
WHERE fid IN
(SELECT fid FROM copies
WHERE copyid=(SELECT copyid FROM library WHERE fid=<fid to play>))

This would provide a list of files that are copies of the requested file. The characteristics of each of the copies may be obtained from the library. The characteristics may be used to decide which copy of the multimedia file is to be selected for playback. The selection process is capable of selecting which version of a multimedia file to play, based on criteria such as: bit rate of the file; encoding format; number of channels used; sample rate; whether the file is available; whether the file is an original version; whether the file has the best audio quality of the multiple files; whether the file has the best video quality of the multiple files; whether a decoder is available to decode the file; whether the file is disposed on local and/or remote non-removable storage and/or local and/or remote removable storage; or other similar characteristics. The selection criterion may be part of the system programming and/or entered by the user.

Multiple characteristics may be used for the selection criterion. In such situations, the characteristics may be weighted as part of the selection process. The weights for the different criteria or weights for the different criteria variables (criteria variables may be input values that are accessed with other criteria variables to evaluate the criteria) may be provided in a number of different manners. Weighting the criteria may be done using a configuration file. The following is an xml example of such a process:

```
<bestcopy>
    <criteria name="original" weight=1000> <!-- this will
    make the original "best" -->
    </criteria>
    <criteria name="audio" weight="5">
        <criteriavariable name="channels" weight="8">
        <criteriavariable name="format" weight="3">
        <criteriavariable name="bitrate" weight="5">
    </criteria>
    <criteria name="video" weight="8"> <!-- video quality is
worth more than audio quality -->
        <criteriavariable name="resolution" weight="8">
        <criteriavariable name="aspectratio" weight="5">
    </criteria>
</bestcopy>
```

In addition to weightings, the system may include Boolean condition statements to eliminate conflicts. For example, if someone only has a single auto CD player and it is already in use by another passenger, then a Boolean condition statement may override the decision that the CD player is the best device on which to play a new song selection.

Figure 8:
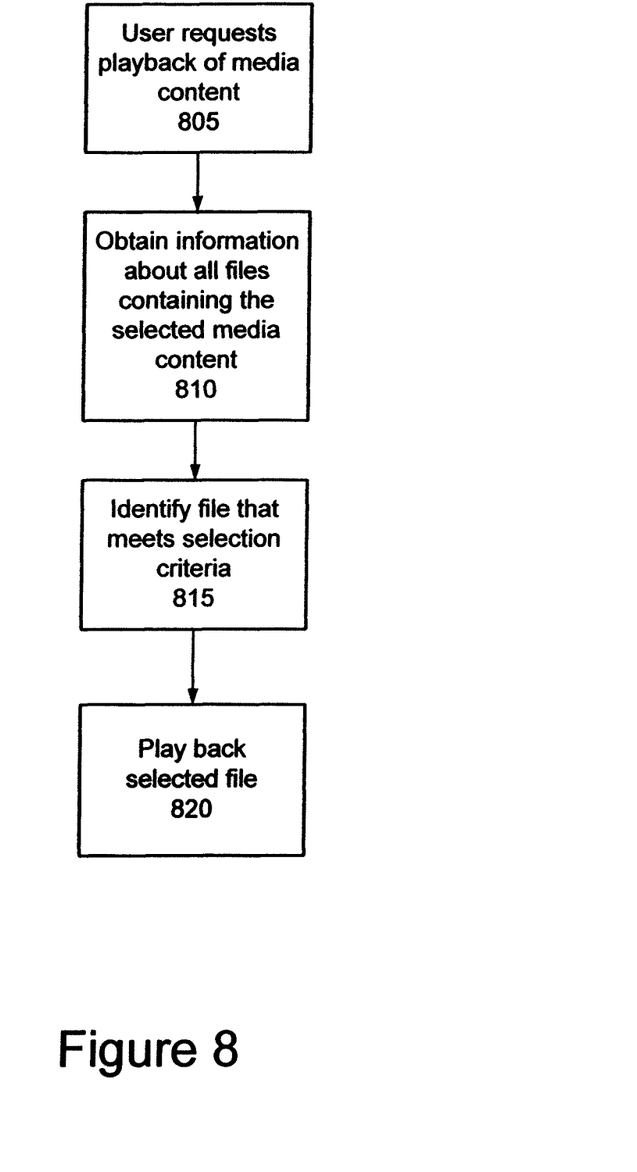
FIG. 8 shows a process that may playback a media file having selected media content where the system includes multiple media files having substantially the same media content.

FIG. 8 shows a process that may be used to playback a media file having selected media content. The system may access multiple media files having substantially the same media content. At 805, the user requests playback of a file having the desired media content. At 810, the multimedia process obtains information about all files containing the selected media content. This information may include the characteristics of each of the files that are to be used as selection criterion. The file that meets those selection criterion is identified at 815. The identified file is played back on the multimedia system amps 820.

Figure 9:
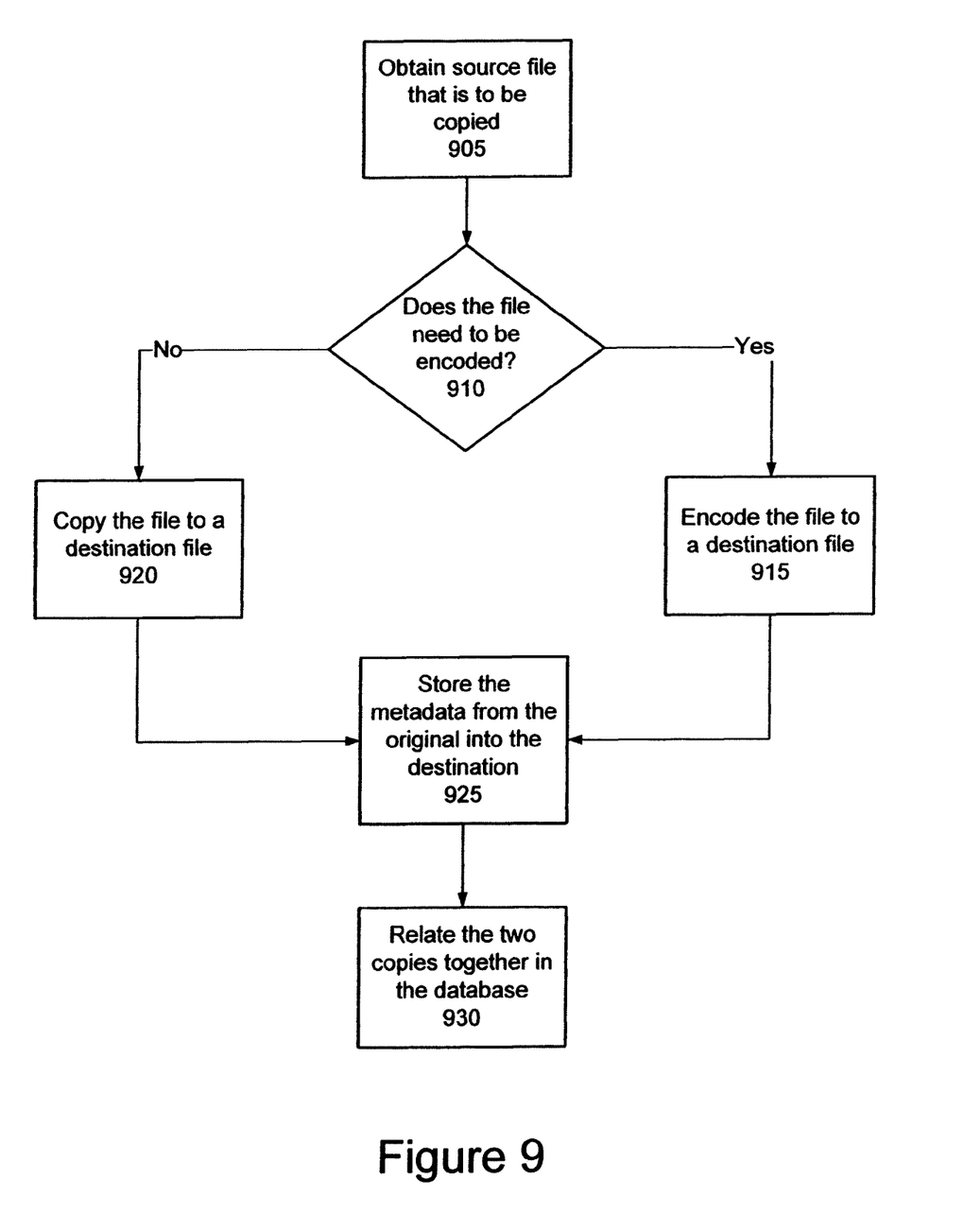
FIG. 9 shows a process that may be used to rip a media file to a multimedia system.

FIG. 9 shows a process that rips a media file to the multimedia system 100. At 905, a source file that is to be ripped to the multimedia system is identified. The file is checked at 910 to determine whether it is to be encoded. If so, then the file is encoded to a destination file at 915. Otherwise, it is copied without further encoding to a destination file at 920. Metadata for the original file is stored into the destination at 925. The two files are related to one another in the database at 930.

The media system may be implemented using a combination of hardware and software components. The software components may be stored in local and/or remote storage devices in that are consolidated and/or distributed. One or more processors may be used to execute the code of the software components. Interface hardware and software may be used to communicate with and/or access media storage and playback devices.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A media system comprising:
media file storage including two or more media files having substantially the same media content, where the two or more media files have different playback characteristics; and
a processor configured to execute playback and selection software, wherein when the processor executes the playback and selection software, the processor is adapted to:
receive a request to playback a media file of the two or more media files having substantially the same media content; and
automatically select one of the two or more media files for playback in response to receipt of the request to playback, the automatic selection being based on a bit rate of at least one of the two or more media files, one or more other playback characteristics of the playback characteristics, and a selection of the media content by a user.

2. The media system of claim 1, wherein the one or more other playback characteristics of the playback characteristics comprises a sample rate of at least one of the two or more media files.

3. The media system of claim 1, wherein the one or more other playback characteristics of the playback characteristics comprises an encoding format of at least one of the two or more media files.

4. The media system of claim 1, wherein the one or more other playback characteristics of the playback characteristics comprises a number of channels used for playback of at least one of the two or more media files.

5. The media system of claim 1, wherein the one or more other playback characteristics of the playback characteristics comprises resources used for playback of at least one of the two or more media files.

6. The media system of claim 1, where the media file storage is associated with at least two media playback devices.

7. The media system of claim 6, where the two or more media files are disposed on alternative media file storage associated with different media playback devices.

8. A media system comprising:
a plurality of media devices, where the plurality of media devices includes at least two or more media files having substantially the same media content but different playback characteristics;
a human machine interface module adapted to accept media content selection commands from a user; and
a media engine module accepting media content selection commands from the human machine interface to select a media file for playback, where the media engine module automatically selects one of the two or more media files for playback based on a weighting of a bit rate of at least one of the two or more media files, one or more other playback characteristics of the playback characteristics, and the media content selection commands from the user.

9. The media system of claim 8, further comprising a database accessible to the media engine module and storing the playback characteristics of the two or more media files.

10. The media system of claim 9, where the database stores the playback characteristics of substantially all media files of the plurality of media devices.

11. The media system of claim 8, where the one or more other playback characteristics of the playback characteristics comprises a sampling rate of at least one of the two or more media files.

12. The media system of claim 8, where the one or more other playback characteristics of the playback characteristics comprises an encoding format of at least one of the two or more media files.

13. The media system of claim 8, where the one or more other playback characteristics of the playback characteristics comprises a number of channels used for playback of at least one of the two or more media files.

14. The media system of claim 8, where the one or more other playback characteristics of the playback characteristics comprises resources used for playback of at least one of the two or more media files.

15. The media system of claim 10, where the media engine module synchronizes the playback characteristics of media files of the plurality of devices with the playback characteristics stored in the database.

16. A media system comprising:
means for storing media files including two or more media files having substantially the same media content with different playback characteristics; and
selection means for automatically selecting from a plurality of end-user devices one of the two or more media files for playback based on a bit rate of at least one of the two or more media files, one or more other playback characteristics of the playback characteristics, and a selection of the media content by a user.

17. The media system of claim 16, where the means for storing comprises a plurality of media devices.

18. The media system of claim 17, where the two or more media files are stored on different media devices of the plurality of media devices.

19. A method of operating a media system comprising:
providing two or more media files having substantially the same media content with different playback characteristics;
receiving a request to playback a media file of the two or more media files having substantially the same media content; and
automatically selecting from a plurality of end-user devices one of the two or more media files for playback in response to receipt of the request to playback, the automatic selection being based on a weighting of a bit rate of at least one of the two or more media files, one or more other playback characteristics of the playback characteristics, and a selection of the media content by a user.

20. The method of claim 19, where the one or more other playback characteristics of the playback characteristics comprises a sample rate of at least one of the two or more media files.

21. The method of claim 19, where the one or more other playback characteristics of the playback characteristics comprises an encoding format of at least one of the two or more media files.

22. The method of claim 19, where the one or more other playback characteristics of the playback characteristics comprises resources used to playback at least one of the two or more media files.

* * * * *